United States Patent
Haikin

(10) Patent No.: US 7,889,387 B2
(45) Date of Patent: Feb. 15, 2011

(54) CONSTRUCTION OF COLORIMETRIC MEASUREMENTS FROM DEVICE PROFILE OF SPECTRAL MEASUREMENTS

(75) Inventor: John S. Haikin, Fremont, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 661 days.

(21) Appl. No.: 11/643,908

(22) Filed: Dec. 22, 2006

(65) Prior Publication Data

US 2008/0151275 A1   Jun. 26, 2008

(51) Int. Cl.
  G03F 3/08  (2006.01)
  H04N 1/46  (2006.01)
  H04N 1/40  (2006.01)
  G09G 5/02  (2006.01)

(52) U.S. Cl. .................. 358/1.9; 358/520; 358/523; 358/3.23; 345/597; 345/601; 345/602; 345/603

(58) Field of Classification Search .............. None
See application file for complete search history.

(56) References Cited

U.S. PATENT DOCUMENTS

| | | | |
|---|---|---|---|
| 7,030,888 B1 | 4/2006 | Edge et al. | 345/604 |
| 7,116,336 B2 | 10/2006 | Van Aken et al. | 345/589 |
| 7,450,158 B2 * | 11/2008 | Ohsawa et al. | 348/222.1 |
| 2002/0145744 A1* | 10/2002 | Kumada et al. | 358/1.9 |
| 2005/0111020 A1* | 5/2005 | Yamamoto | 358/1.9 |
| 2005/0249403 A1* | 11/2005 | Haikin | 382/162 |

FOREIGN PATENT DOCUMENTS

WO    2005/109318    11/2005

* cited by examiner

*Primary Examiner*—Mark K Zimmerman
*Assistant Examiner*—Haris Sabah
(74) *Attorney, Agent, or Firm*—Fitzpatrick, Cella, Harper & Scinto

(57) ABSTRACT

A device model object which numerically constructs colorimetric measurements based on access to a spectrally-based device profile. In situations where a color management module issues a request for spectral measurements, then the device model object provides spectral measurements directly from the spectrally-based device profile. However, in situations where the color management module issues a request for colorimetric measurements, then the device model object numerically constructs colorimetric measurements based on numerical integration of spectral measurements from the spectrally-based device profile against a viewing condition white point. The constructed measurements are provided to the color management module and they are also cached for possible future use. In this way, the device model object is able to support requests for both measurement-based device profiles and spectrally-based device profiles.

5 Claims, 4 Drawing Sheets

CONSTRUCTION OF COLORIMETRIC MEASUREMENTS FROM DEVICE PROFILE OF SPECTRAL MEASUREMENTS

BACKGROUND OF THE INVENTION

1. Field of the Invention

The present invention concerns color management systems, and specifically concerns construction of colorimetric measurements from spectral measurements of the device, so as to assure interoperability with color management systems that rely on spectral measurements well as those that rely on colorimetric measurements.

2. Description of the Related Art

Color management systems historically found their roots in transform-based systems, in which a sequence of simple transformations was applied in order to convert from one color space to another. As an example, simple matrix multiplications might have been used. The coefficients in the matrices were stored in device profiles, which herein are designated as "transform-based" device profiles. Color management systems which used transform-based device profiles are herein designated as "transform-based" color management systems.

Over time, inadequacies were noticed in transform-based color management systems and their transform-based device profile counterparts. It was found that better performance could be obtained by creating device profiles that stored actual colorimetric measurements of the device's color characteristics. Such device profiles are herein designated as "measurement-based" device profiles, and the color management systems that used colorimetric measurements are herein designated as "measurement-based" color management systems.

The measurement information in a measurement-based device profile is colorimetric data, typically, CIEXYZ measurements. Measurement-based color management systems access the measurement data via a device model object. During the initialization process, the color management system accesses the device model object to obtain device colorant combinations and the associated measurements in order to build an analytical model of the device behavior for the specific condition indicated by the measurements in the device model profile. In addition to the device model information, a separate viewing condition profile is provided which contains measurements of the viewing environment under which a document is to be viewed. These measurements include a white point.

For purposes of backward compatibility, the inventor herein has previously worked to develop a conversion process, whereby measurement-based device profiles could be used in older transform-based color management systems. WO 2005/109318 is a recent publication of this work, and describes a process by which measurement-based device profiles are used to generate a corresponding transform-based device profile, which then could be used in older transform-based color management systems.

More recently, in connection with advances in color management systems, there is a desire to make use of spectral measurements rather than colorimetric measurements. The advantage of spectral measurements is that the appearance of colors can be determined under many different lighting conditions, thereby providing a more flexible tool for color management. In this model, the device profile will contain spectral measurements rather than colorimetric measurements, and the color management system will receive the spectral measurements from the device model object in spectral form. Spectrally-based color management systems, together with spectrally-based device profiles, hold out promise of unparalleled accuracy in color reproduction and fidelity.

For backwards compatibility purposes, however, a spectrally-based device profile cannot be used in current measurement-based color management systems.

SUMMARY OF THE INVENTION

The invention herein addresses this shortcoming, by constructing colorimetric measurements using spectrally-based device profiles.

Accordingly, the invention concerns a measurement-based color management system which accesses a device model object to request measurement-based colorimetric measurements for the device. If the device model object has colorimetric measurements for the device, then the colorimetric measurements from the device profile are immediately returned to the color management system. On the other hand, if the device model object has a spectrally-based device profile, then the device model object constructs colorimetric measurements from the spectral measurements in the spectrally-based device profile. Construction of the colorimetric measurements proceeds by numerical integration of the spectrally-based device profile with the viewing condition illumination. The resulting calculations are representative of actual colorimetric measurements for the device, and they are provided for use to the color management system.

By virtue of the foregoing arrangement, it is possible to provide backwards compatibility with measurement-based color management systems, ordinarily without the need to store both a spectrally-based device profile and a measurement-based device profile, and also ordinarily without the need to modify older measurement-based color management systems so that they also accept the spectral measurements of spectrally-based device profiles. Instead, these older systems can continue to access the device model object through existing software interfaces, leaving it to the device model object to construct the colorimetric measurements on an as-needed basis.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION OF THE PREFERRED EMBODIMENTS

A color management system according to the present invention may be incorporated in an output device driver for execution in a computing device, such as a printer driver, embedded in the firmware of an output device, such as a printer, or provided in a stand-alone color management application for use on a general purpose computer. A particularly preferable arrangement is to incorporate the color management system directly into the operating system for the general purpose computer. It can be appreciated that the present invention is not limited to these embodiments and that the present invention may be used in other environments in which color management is used.

Figure 1:
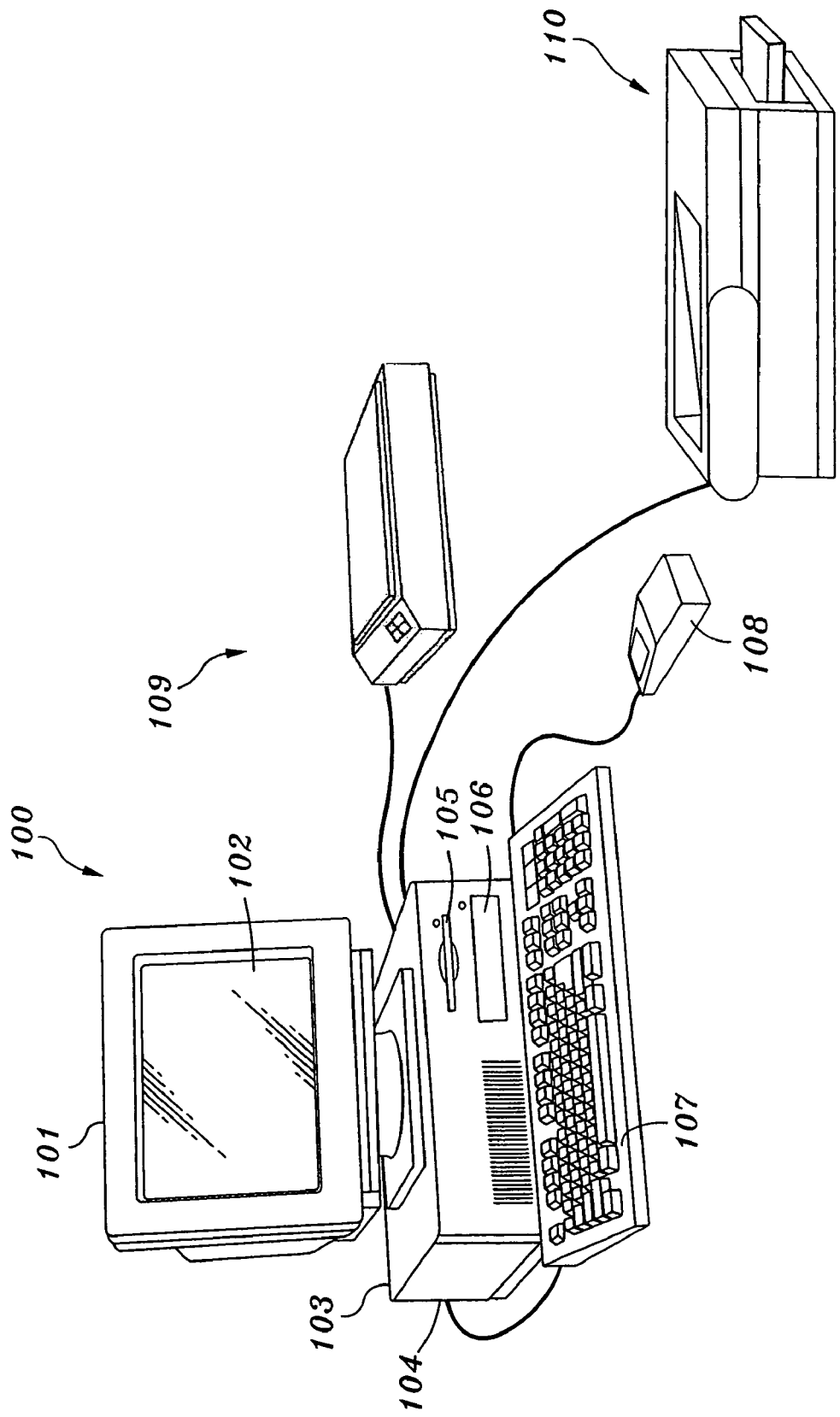
FIG. 1 is a representative view of a computer system in which the present invention may be implemented.

FIG. 1 shows a representative view of the outward appearance of a representative computing system including computing equipment, peripherals and digital devices which may be used in connection with the practice of the present invention. Computing equipment 100 includes host processor 103 which comprises a personal computer (hereinafter "PC"). Provided with computing equipment 100 are color monitor 101 including display screen 102, keyboard 107 for entering text data and user commands, and pointing device 108. Pointing device 108 preferably comprises a mouse for pointing and for manipulating objects displayed on display screen 102.

Computing equipment 100 includes a computer readable memory medium such as computer fixed disk 106 and/or CD-ROM drive 105. These drives provide a means whereby computing equipment 100 can access information, such as image color data, computer-executable process steps, application programs, device profiles, color management systems, etc. stored on removable and non-removable memory media.

Scanner 109 is an image input device which obtains color data in a source device color space. Printer 110 is an output device which forms color images on a recording medium in a destination device color space.

Color characteristics of both the source device and the destination device are characterized by spectral measurements stored respectively in source and destination device profiles.

Figure 2:
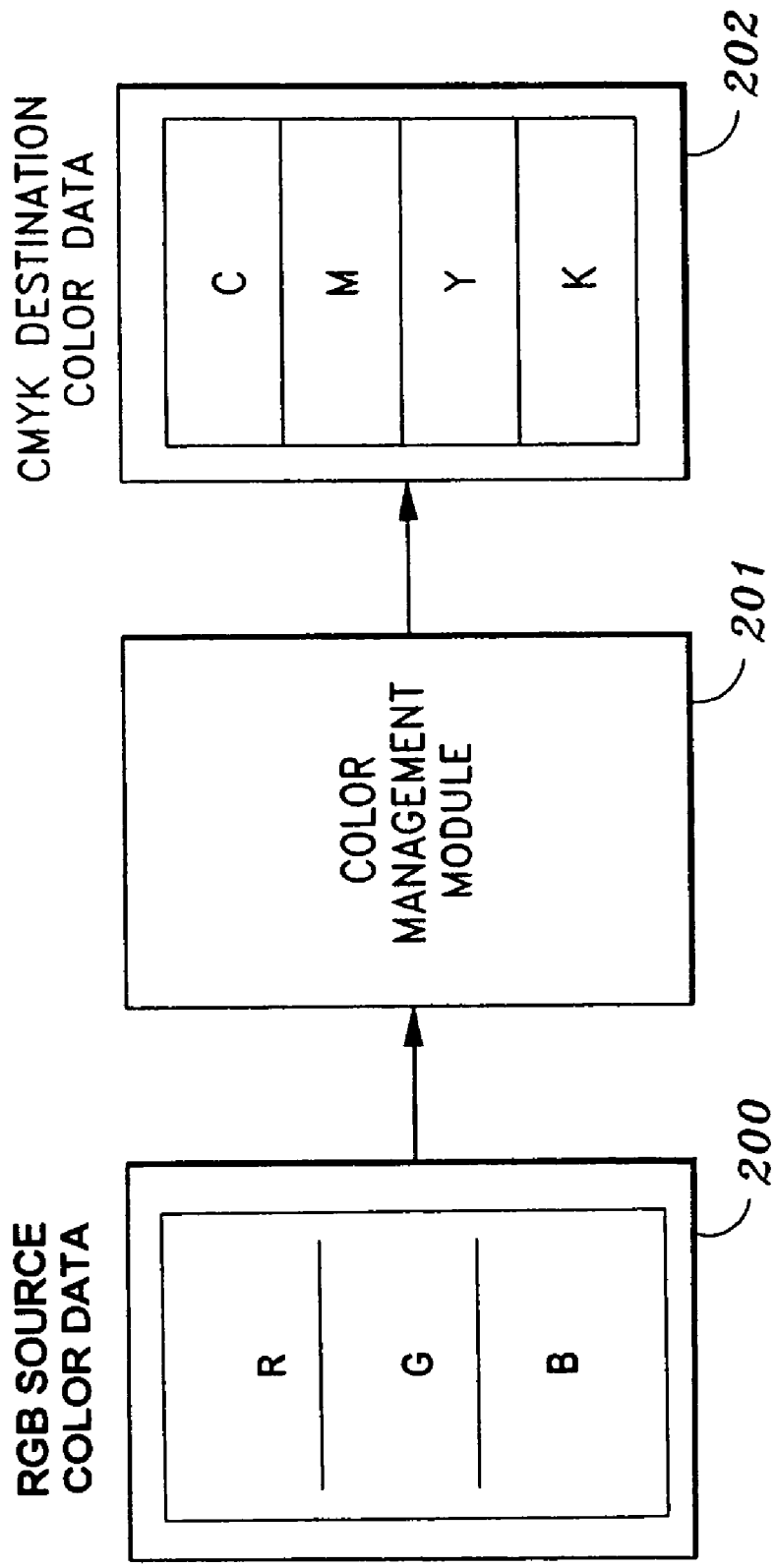
FIG. 2 is a view for providing a general explanation of a color management system according to the invention.

FIG. 2 shows a view for providing a general explanation of a color management according to the present invention. The color management system is implemented in color management module (CMM) 201. CMM 201 is applied to RGB source color data 200 from scanner 109 in order to generate CMYK destination color data 202 for printer 110

Color management module 201 implements measurement-based color management, in the sense that the color transforms used by module 201 are derived from colorimetric measurements contained in device profiles.

Figure 3:
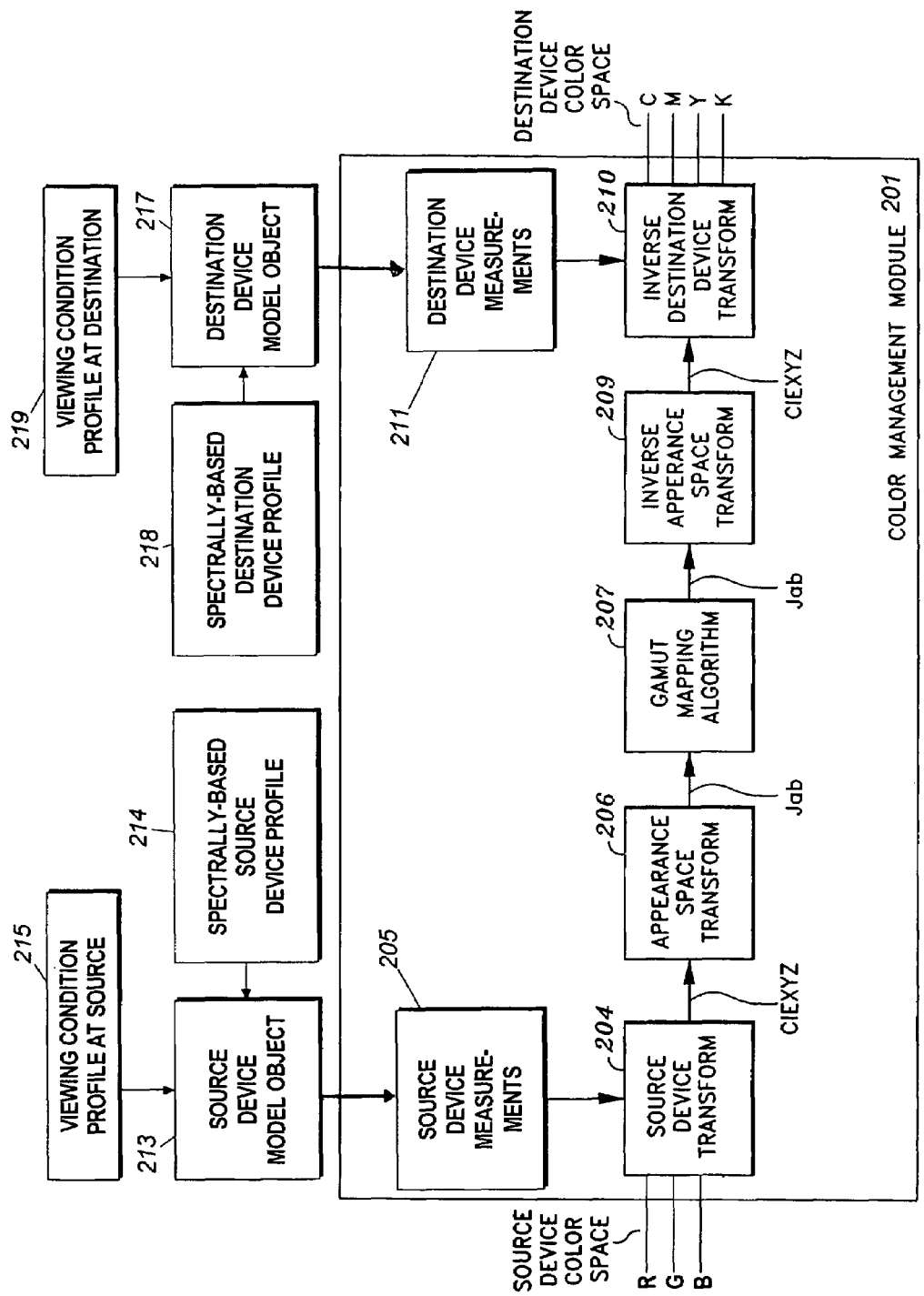
FIG. 3 is a representational view of color transform processing performed by a color management system according to the invention.

FIG. 3 is a explanatory view showing the transformation pipeline implemented by color management module 201. As seen in FIG. 3, the color management module accepts a color value in source device color space and, through a series of transformations and mappings through a profile connection space, transforms the color value into a corresponding value in the destination color space. Specifically, the color management module accepts an RGB color, and applies a source device transform 204 so as to transform the color value in source device color space to a device independent color space such as CIEXYZ. Source device transform 204 is derived from source device measurements 205, which provide measurements that characterize the source device. An appearance space transform 206 is thereafter applied to the device-independent color space, so as to transform the color value into a device-independent and viewing condition independent color space such as Jab color space. A gamut mapping algorithm 207 is applied to the transformed color value in Jab space, so as to accommodate differences between the color gamut of the source device and the color gamut of the destination device. The output of the gamut mapping algorithm 207 is a color value that remains in the Jab color space, meaning that the color space is still device-independent and viewing condition independent. An inverse transform 209 is thereafter applied so as to transform the color value into a device independent color space such as CIEXYZ. Finally, a destination device transform 210 (actually, and more accurately, an inverse transform) is applied so as to transform the color value in the device independent color space into a color value in the destination device color space. The destination device transform 210 is constructed using destination device measurements 211. Like source device measurements 205, destination device measurements 211 provide measurements that characterize the destination device.

Source device measurements 205 are obtained from source device model object 213. The measurements in source device measurements 205 (and in destination device measurements 211) are spectral measurements if the color management module 201 uses spectral measurements, or they are colorimetric measurements if color management module 201 uses colorimetric measurements. In the latter case, the colorimetric measurements are constructed numerically, as discussed below. In some cases, both colorimetric and spectral measurements are provided in source and destination device measurements 205 and 211.

In general, the device model objects, for both the source device and the destination device, act as an intermediary between color management model 201 and requests for information that characterize the device. The device model object therefore can interact with different types of color management modules, and in particular the device model object can interact with color management modules that use spectral measurements or color management modules that use colorimetric measurements. If the color management module uses spectral measurements, then it would request spectral measurements for the device, and the device model object would provide spectral measurements. On the other hand, if the color management module uses colorimetric measurements (as it does in the present embodiment), and requests colorimetric measurements from the device model object, then the device model object constructs colorimetric measurements numerically from spectral measurements, as described in more detail below.

Thus, as shown in FIG. 3, source device model object 213 has access to a spectrally-based device profile 214 for the source device. It further has access to a viewing condition profile 215 at the source device.

Likewise, with respect to the destination device, destination device model object 217 has access to a spectrally-based destination device profile 218, as well as a viewing condition profile 219 at the destination. With this information, the source and destination device model objects 213 and 217 are able to numerically construct colorimetric measurements for use by the measurement-based color management module 201, using the following numerical methods.

Measurements for both device model data and viewing condition white points can be represented either colorimetrically, using a tristimulus system such as CIEXYZ or spectrally. In the tristimulus system, three numbers are used to represent a color; these numbers can be converted to the three visual correlates of the Human Visual System (HSV) using a linear transform (3×3 matrix multiplication). Spectral measurements are represented as histograms running across the visual spectrum, starting around 540 nanometers (nm.) and running to around 740 nm. The number of steps in the histogram and the interval between the steps is immaterial; what is being represented is the spectral power distribution of the light that is being measured. Spectral measurements are usually independent of the human visual system but often represent reflectances, that is, light reflected from a surface. When the measurements are of a reflectance, they of necessity involve not only the spectral reflectance of the material but the spectrum of the light source that is supplying the illumination for the measurement.

If the illumination spectrum is available along with a spectral reflectance, it is a simple matter to compute a corresponding tristimulus value by applying the CIE recommendations 3.1 from the CIE Technical Report on Colorimetry (CIE 15.2-1986). The value of X, Y, and Z are determined by multiplying the value of the color stimulus function at each wavelength measured by the value of the corresponding CIE color-matching function at that wavelength, multiplying then by the corresponding value of the illumination spectrum, and integrating (adding) the set of products over the range of the visible spectrum.

The following pseudo-code in the C++ programming language demonstrates the process. In this example, the function Phi returns the value of the illumination corresponding to the given wavelength lambda; the function LookupSpectrum returns the value of the standard colorimetric observer (for xBar, yBar, and zBar) corresponding to a given wavelength lambda.

```
for (UINT lambda = m__first; lambda <= m__last; ++lambda)
{
    FLOAT phi, power;
    hr = Phi(illuminant, lambda, &phi);
    if (FAILED(hr))
    {
        goto Cleanup;
    }
    hr = xBar.LookupSpectrum(lambda, &power);
    if (FAILED(hr))
    {
        goto Cleanup;
    }
    if (lambda == m__first || lambda == m__last)
    {
        //
        // Trapezoidal rule
        //
        power *= 0.5f;
    }
    pTristim->X += phi * power;
    hr = yBar.LookupSpectrum(lambda, &power);
    if (FAILED(hr))
    {
        goto Cleanup;
    }
    if (lambda == m__first || lambda == m__last)
    {
        //
        // Trapezoidal rule
        //
        power *= 0.5f;
    }
    pTristim->Y += phi * power;
    hr = zBar.LookupSpectrum(lambda, &power);
    if (FAILED(hr))
    {
        goto Cleanup;
    }
    if (lambda == m__first || lambda == m__last)
    {
        //
        // Trapezoidal rule
        //
        power *= 0.5f;
    }
    pTristim->Z += phi * power;
}
```

Figure 4:
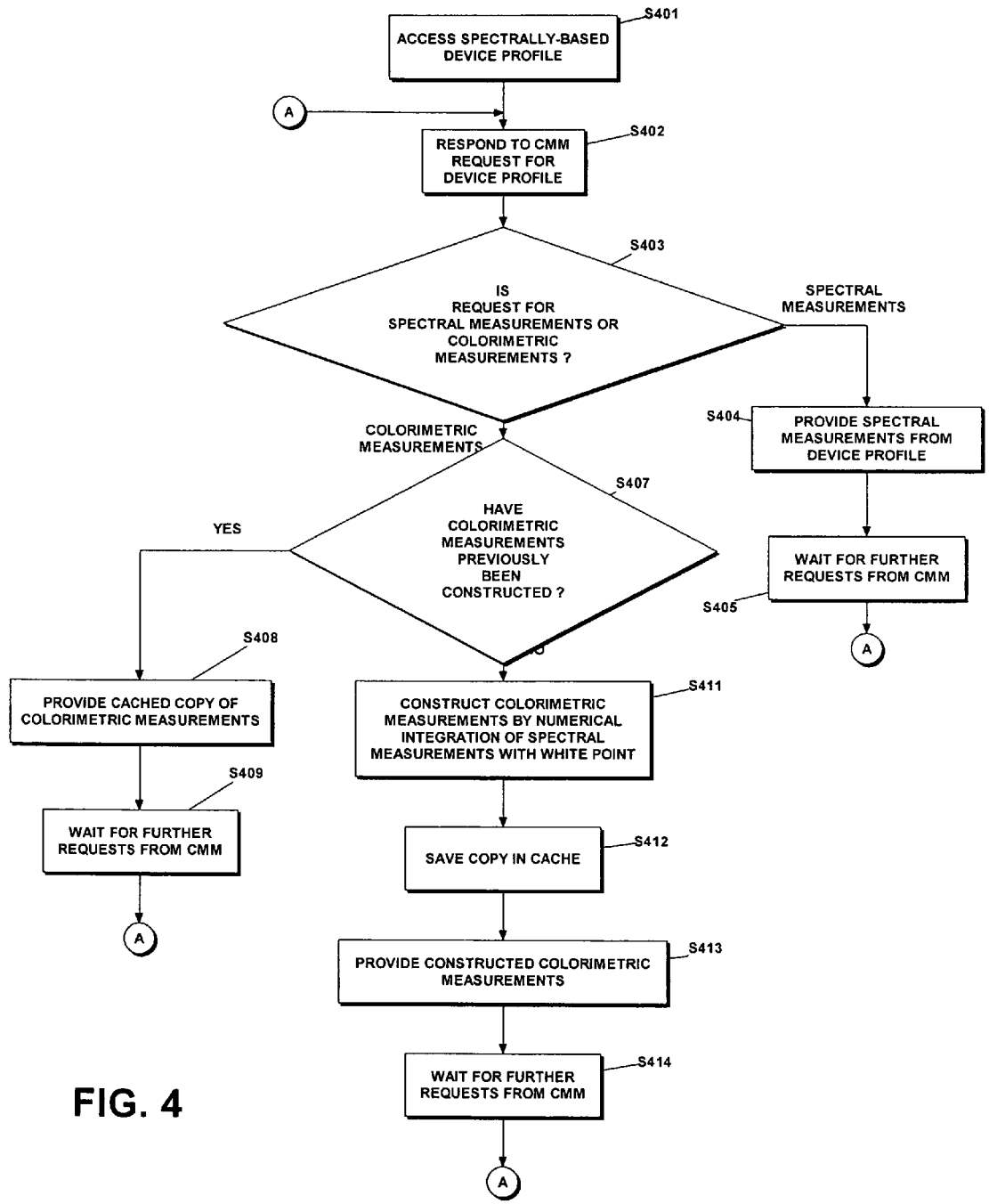
FIG. 4 is a flow diagram for explaining construction of colorimetric measurements from spectral measurements in a spectrally-based device profile.

FIG. 4 is a flow diagram showing operation of the source device model object and destination device model object. In step S401, the device model object accesses a spectrally-based device profile containing spectral measurements that characterize the color characteristics of the device. The device model object then enters a waiting state, waiting for a request from the color management module for a device profile. As step S402, such a request is received, and in step S403, the device model object determines whether the color management module has issued a request for spectral measurements or for colorimetric measurements. If the color management module has issued a request for spectral measurements, then flow branches to step S404 in which the device model object provides the spectral measurements from the spectrally-based device profile that was accessed in step S401. Again, the device model object enters a waiting state (step S405) for further requests which are handled again at step S402.

On the other hand, if in step S403 the device model object determines that the request was a request for colorimetric measurements, then flow advances to step S407. In step S407, the device model object determines whether it has previously constructed colorimetric measurements, such that it would be able to provide the measurements from a cached copy of them. If there is a previously-cached copy of the colorimetric measurements, then flow branches to step S408 in which the device model object provides the cached copy. The device model object then enters a waiting state (step S409) in which it waits for further requests which (as before) are handled in step S402.

If in step S407 the device model object determines that it has not yet constructed colorimetric measurements, then flow advances to step S411 in which the device model object constructs colorimetric measurements from the spectral measurements in the device profile, according to the numerical integration described hereinabove. Specifically, the device model object constructs the colorimetric measurements by integrating the spectral measurements in the spectrally-based profile accessed in step S401 against the viewing condition profile white point. A copy of the so-constructed measurements is saved (step S412) in a cache for future use, and the constructed colorimetric measurements are provided to the color management module in step S413. Thereafter, the device model object enters a waiting state (step S414) waiting for further requests from the color management module, which are handled in step S402.

The invention has been described with particular illustrative embodiments. It is to be understood that the invention is not limited to the above-described embodiments and that various changes and modifications may be made by those of ordinary skill in the art without departing from the spirit and scope of the invention.

What is claimed is:

1. A device model object for providing colorimetric measurements to a color management module, comprising:

accessing means for accessing a spectrally-based device profile of a device, wherein the device profile contains spectral measurements that characterize the device;

receiving means for receiving a request from the color management module for a device profile, wherein the request is for spectral measurements or for colorimetric measurements;

determining means for determining whether colorimetric measurements have been previously constructed;

constructing means for constructing colorimetric measurements through numerical integration of the spectral measurements contained in the spectrally-based device profile and a viewing condition white point, and for caching the constructed colorimetric measurements; and providing means for providing a device profile to the color management module in response to a request from the color management module;

wherein responsive to a request for spectral measurements, the device profile contains the spectral measurements that characterize the device;

wherein responsive to a request for colorimetric measurements in a case where a determination is made that the colorimetric measurements have been previously constructed, the device profile contains the cached constructed colorimetric measurements; and wherein responsive to a request for colorimetric measurements in a case where a determination is made that the colorimetric measurements have not been previously constructed, the colorimetric measurements are constructed using the constructing means, and the device profile contains the constructed colorimetric measurements.

2. A method performed in a computer by a device model object in interaction with a color management module being executed on the computer, comprising the steps of:

accessing memory of the computer which stores a spectrally-based device profile of a device, wherein the device profile contains spectral measurements that characterize the device;

receiving a request from the color management module for a device profile, wherein the request is for spectral measurements or for colorimetric measurements;

determining whether colorimetric measurements have been previously constructed;

constructing colorimetric measurements through numerical integration of the spectral measurements contained in the spectrally-based device profile and a viewing condition white point and caching the constructed colorimetric measurements; and providing a device profile to the color management module in response to a request from the color management module;

wherein responsive to a request for spectral measurements, the device profile contains the spectral measurements that characterize the device;

wherein responsive to a request for colorimetric measurements in a case where a determination is made that the colorimetric measurements have been previously constructed, the device profile contains the cached constructed colorimetric measurements; and wherein responsive to a request for colorimetric measurements in a case where a determination is made that the colorimetric measurements have not been previously constructed, the colorimetric measurements are constructed, and the device profile contains the constructed colorimetric measurements.

3. A method according to claim 2, further comprising the step of maintaining a copy of the constructed colorimetric measurements, wherein in response to additional requests for colorimetric measurements, the device model object provides the cached copy.

4. Computer-executable process steps retrievably stored on a non-transitory computer readable memory medium, the computer-executable process steps for providing colorimetric measurements to a color management module, the computer-executable process steps comprising process steps executable to perform a method according to claim 2.

5. A non-transitory computer-readable memory medium which retrievably stores computer-executable process steps, the computer-executable process steps for providing colorimetric measurements to a color management module, the computer-executable process steps comprising process steps executable to perform a method according to claim 2.

* * * * *